US006212400B1

(12) United States Patent
Scholz

(10) Patent No.: US 6,212,400 B1
(45) Date of Patent: Apr. 3, 2001

(54) ANTENNA DEVICE FOR MOBILE RADIO TELEPHONE DEVICES

(75) Inventor: Ralf Scholz, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/060,807

(22) Filed: Apr. 15, 1998

(30) Foreign Application Priority Data

Apr. 15, 1997 (DE) ............................................. 197 15 726

(51) Int. Cl.[7] ...................................................... H04Q 7/32

(52) U.S. Cl. .............................. 455/550; 455/90; 455/97; 455/575; 343/702; 343/895; 379/433; 379/428

(58) Field of Search .............................. 455/90, 575, 403, 455/550, 97; 343/702, 892, 900, 792, 790, 895; 379/433, 428

(56) References Cited

U.S. PATENT DOCUMENTS 5,504,494 * 4/1996 Chatzipetros et al. ............... 343/702
5,734,351 * 3/1998 Ojantakanen et al. ............... 343/702
5,907,306 * 12/1999 Karabinis et al. ................... 343/702
5,963,871 * 10/1999 Zhinong et al. ...................... 455/550
5,999,133 * 12/1999 Svensson ............................ 343/702

* cited by examiner

*Primary Examiner*—Lee Nguyen
*Assistant Examiner*—Keith Ferguson
(74) *Attorney, Agent, or Firm*—Schiff Hardin & Waite

(57) ABSTRACT

An antenna device is provided that is particularly suitable for mobile radio telephone device. The antenna device has a first helix antenna, a helix antenna connectible to the first helix antenna as well as an extensible rod antenna. In the extended condition of the rod antenna, a connector element connects only the rod antenna to the first helix antenna. In the retracted condition of the rod antenna, the connector element connects only the second helix antenna to the first helix antenna. An antenna device having a low space requirement is thus created. It is simultaneously assured that, regardless of the retracted or extended condition of the rod antenna, an antenna device that is matched to the optimum transmission/reception power is always formed by a combination of two antennas.

8 Claims, 2 Drawing Sheets

ANTENNA DEVICE FOR MOBILE RADIO TELEPHONE DEVICES

BACKGROUND OF THE INVENTION

The present invention generally relates to an antenna device. More specifically, the present invention relates to an antenna device particularly for mobile radio telephone devices. The present invention is further directed to a mobile radio telephone device.

It is standard in mobile radio telephone devices to employ what are referred to as tuned or matched antennas, i.e. antennas whose effective length has a specific relationship to the wavelength $\lambda$ of the frequency range to be received. Given a mobile radio telephone device for what is referred to as the GSM standard, the frequency range to be received/transmitted amounts to approximately 900 MHZ through 1000 MHZ. Accordingly, the wavelength of this frequency range lies at approximately thirty through thirty-five cm.

An antenna that is tuned to half the wavelength of the frequency range to be received must thus exhibit an effective electrical length of about fifteen through eighteen cm for the GSM standard. It is obvious that an antenna having a length of 15–18 cm is a great disadvantage given the desire to make a mobile radio telephone device as handy as possible. A firmly attached antenna of this size projecting from the housing of the mobile radio telephone device is also out of the question for the reason that such an antenna is an extreme risk in view of damage by bending or breaking.

Up to now, it has been standard to provide a mobile radio telephone device with a rod antenna of the aforementioned length that can be telescoped in or to provide a helix antenna (spiral antenna) having the same electrical length or to provide a combination of helix and rod antenna. Before the mobile radio telephone device is placed in operation, the antenna must be pulled out in the case of a rod antenna. This solution has the disadvantage that the transmission/reception power of the mobile radio telephone device is deteriorated when the operator forgets to pull the antenna out before operation of the mobile radio telephone device. A helix antenna by itself has the disadvantage of poor reception/transmission properties, i.e. poor performance.

SUMMARY OF THE INVENTION

It is, therefore, an object of the present invention to create an antenna device that enables good transmission/reception properties of the antenna with little space requirement, even in the retracted condition.

This advantage is achieved by the combination of two known structuring principles. According to the present invention, an antenna device, particularly for mobile radio telephone devices, has a first helix antenna (spiral antenna), a second antenna connectible to the first helix antenna as well as an extensible rod antenna. The antenna device is thereby designed such that a connector element, for example a standard antenna contact element, connects only the rod antenna to the first helix antenna in the extended condition of the rod antenna. In the retracted condition of the rod antenna, by contrast, only the second helix antenna is connected to the first helix antenna by the connector element.

The solution of the present invention is thus composed of two individual antennas that can be fundamentally mounted independently of one another.

Advantageously, the first helix antenna, the second helix antenna as well as the rod antenna are respectively tuned to ¼ of the wavelength $\lambda$ of the frequency range to be transmitted/received. Each of the antennas thus forms what is referred to as a quarter-wave radiator ($\lambda/4$ radiator) in and of itself. Due to the combination of the antennas of the present invention, a further quarter-wave radiator is respectively coupled to the first quarter-wave radiator, namely to the first helix antenna. In the extended condition of the rod antenna, the rod antenna is coupled as a quarter-wave radiator to the first helix antenna; in the retracted condition of the rod antenna, by contrast, the second helix antenna is coupled to the first helix antenna. Both in the retracted as well as in the extended condition of the rod antenna, a $\lambda/2$ radiator is formed overall. This represents an advantage for tuning of the antenna device for the necessary reception/transmission power.

Advantageously, the region of the rod antenna that lies in the proximity of the helix antennas in the retracted condition of the rod antenna is composed of a non-conductive material. It is thereby assured that the fields of the first and of the second helix antenna are hardly influenced by the rod antenna in the retracted condition of the rod antenna wherein only the second helix antenna is coupled to the first helix antenna.

The first helix antenna is preferably a coil on a printed circuit board.

An especially low space requirement derives when the rod antenna is arranged coaxially relative to the helix antenna. In this respect, it is especially beneficial when the first helix antenna is arranged parallel to and slightly offset from the second helix antenna.

The present invention also provides a mobile radio telephone device with an antenna device of the aforementioned species. It is thereby especially advantageous in view of the space requirement when the second helix antenna is accommodated in a stub-shaped projection in the housing of the mobile radio telephone device.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
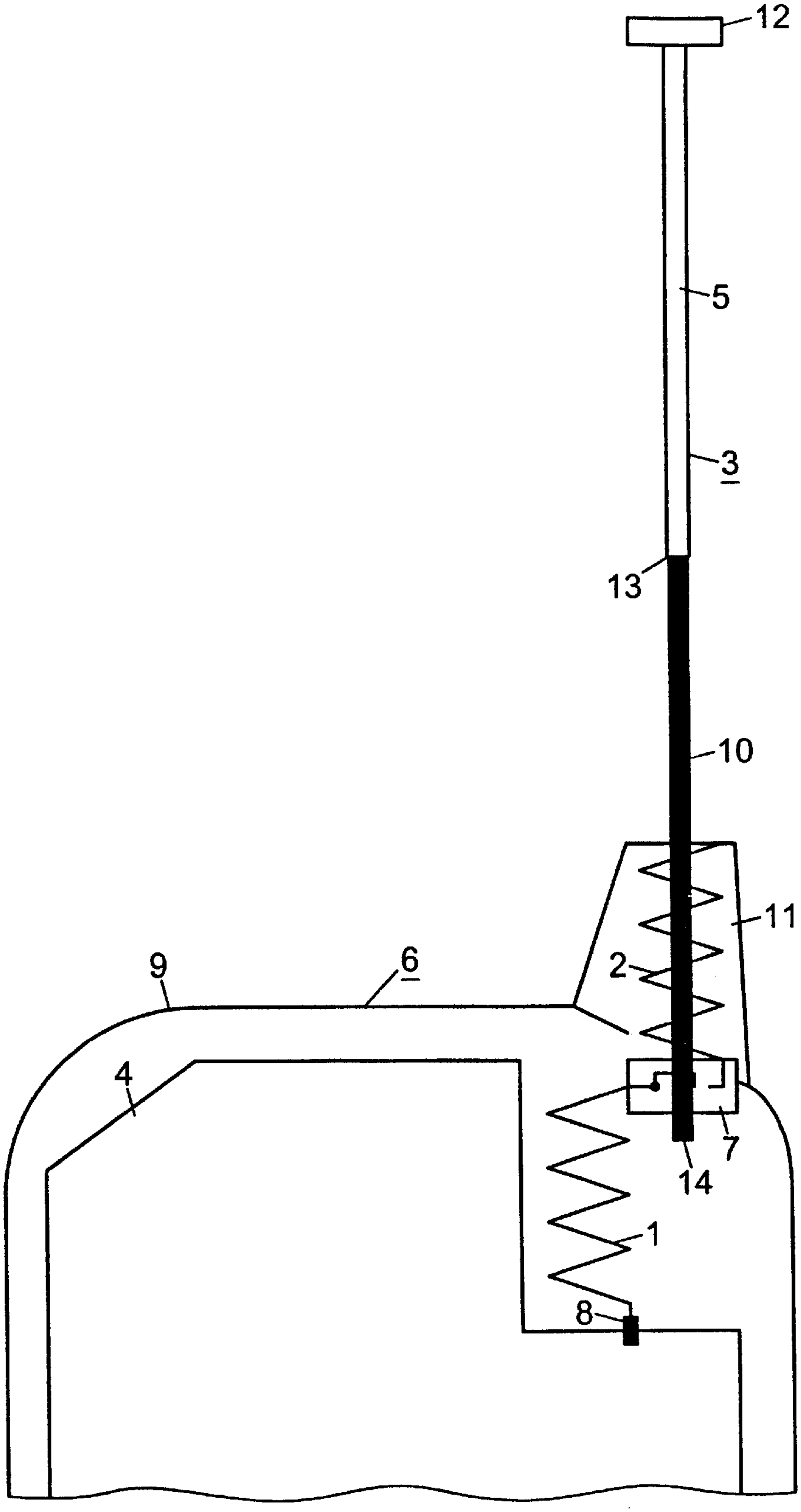
FIG. 1 is a side view of an embodiment of an antenna device of the present invention.

Referring to the drawings, FIG. 1 shows an antenna device of the present invention installed in a mobile radio telephone device wherein a rod antenna is extended.

FIG. 1 further shows a mobile radio telephone device 6 with a housing 9. For example, the mobile radio telephone device 6 is what is referred to as a mobile telephone (handy) of the GSM standard. According to the GSM standard, information is transmitted in a frequency range between 900 and 1000 MHZ. FIG. 1 also shows an antenna device that is composed of a helix antenna (spiral antenna) 1 installed in the housing 9 of the mobile radio telephone device 6, a connector element (antenna contact element) 7, a second helix antenna 2 as well as a rod antenna 3. FIG. 1 further illustrates the antenna device in that condition wherein the rod antenna 3 is extended from the housing 9 of the mobile radio telephone device 6.

Figure 2:
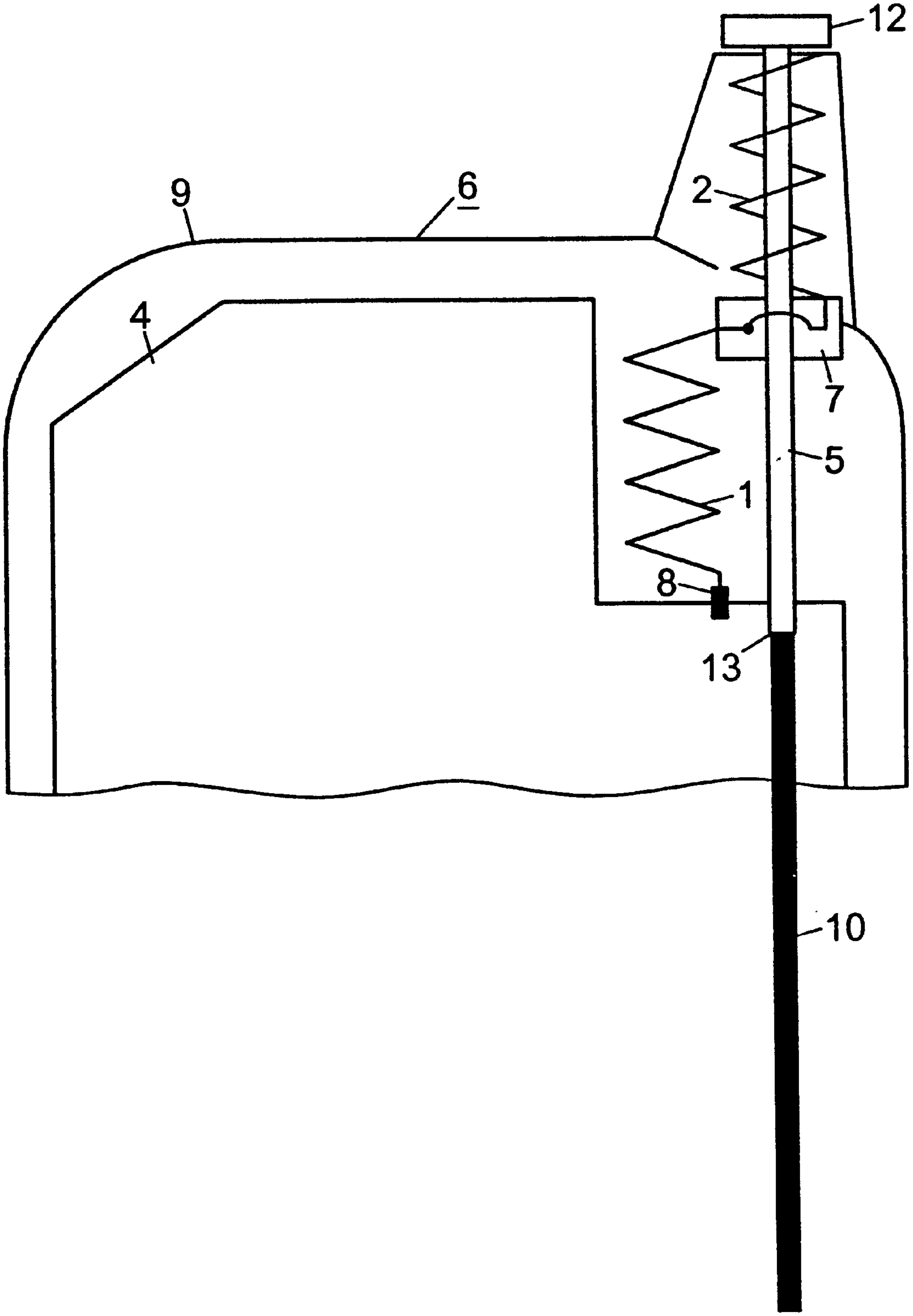
FIG. 2 is a side view of the antenna device of FIG. 1 in a retracted condition.

Referring now to FIG. 2, the antenna device is shown in a condition wherein the rod antenna 3 is retracted into the housing 9 of the mobile radio telephone device 6. FIG. 1 also shows a printed circuit board 4 that, for example, carries a processing circuit (not shown) of the mobile radio telephone device 6.

In the illustrated exemplary embodiment, the first helix antenna 1, the second helix antenna 2 as well as the rod antenna 3 each respectively exhibit an effective length that amounts to ¼ of the wavelength λ of the frequency range to be received/transmitted. In the GSM standard, ¼ of the wavelength λ of the frequency range to be transmitted/received amounts between seven and nine cm. The dimensions of the individual antennas are thus such that they can be integrated into a compact mobile radio telephone device 6.

The first helix antenna 1, the second helix antenna 2 and the rod antenna 3 thus each respectively form what is referred to as a quarter-wave radiator or λ/4 radiator. In FIG. 1, numeral 7 references a contact element schematically shown in the sense of a block circuit diagram. The internal structure of the contact element 7 cannot be seen from FIG. 1.

According to the present invention, the contact element 7 is implemented such that, given the condition of the rod antenna 3 extended from the housing 9 of the mobile radio telephone device 6 shown in FIG. 1, only the rod antenna 3 is connected to the first helix antenna 1 built into the housing 9 of the mobile radio telephone device 6. In the extended condition of the rod antenna 3, thus, the first helix antenna 1 and the rod antenna 3 together form what is referred to as a λ/2 radiator. When the rod antenna 3 is not or, alternatively, not completely extended from the housing 9 of the mobile radio telephone device 6, by contrast, the contact device 7 no longer connects the rod antenna 3 to the first helix antenna 1 built into the housing 9.

As soon as the contact device 7 disconnects the connection between the rod antenna 3 and the first helix antenna 1 built into the housing 9 of the mobile radio telephone device 6, it produces a connection between the second helix antenna 2 and the first helix antenna 1. When the rod antenna 3 is not or, respectively, not completely extended from the housing 9 of the mobile radio telephone device 6, only the second helix antenna 2 is connected to the first helix antenna 1. In this condition, the first helix antenna 1 and the second helix antenna 2 together form a λ/2 radiator.

According to the present invention, the contact device 7 assures that a further quarter-wave radiator is coupled to the first helix antenna 1 which likewise forms a quarter-wave radiator regardless of the condition of the rod antenna 3. In particular, the antenna device of the present invention assures that an adequate transmission/reception power is established, even when the user happens to forget to completely extend the rod antenna 3 from the housing 9 of the mobile radio telephone device 6. It should be noted, however, that the function of the contact element 7, as set forth above, cannot be fully seen from the schematic illustration in FIGS. 1 and 2.

The first helix antenna 1 can be formed by a coil on the printed circuit board 4. An extremely space-saving and cost-beneficial solution is thus derived. Alternatively, the first helix antenna 1 can be implemented as a permanently installed helix part. In this case, the first helix antenna 1, as shown in FIG. 1, is provided with an antenna matching network 8 at that side facing away from the contact device 7. This antenna matching network 8 may be tuned or matched to a λ/2 radiator (half-wave radiator). Due to this antenna matching network 8, the first helix antenna 1 is connected to the processing circuit (not shown) of the mobile radio telephone device 6 provided on the printed circuit board 4. The first helix antenna 1 may be spatially allocated to the antenna matching network 8. The antenna matching network 8 is only schematically shown in the sense of a block circuit diagram in FIGS. 1 and 2 since its internal structure is not relevant to the present invention.

According to the present invention, thus, it is always assured that a λ/2 radiator is formed independently of the retracted or extended condition of the rod antenna 3. This yields an optimum transmission/reception power of the antenna device. In its extended condition, the rod antenna renders the second helix antenna 2 ineffective so that only one quarter-wave radiator is connected to the first quarter-wave radiator, namely the first helix antenna 1, in any case.

As can be seen from FIGS. 1 and 2, the rod antenna 3 is composed of an upper region 5 as well as of a lower region 10. What is thereby referred to as the upper region 5 is that region of the rod antenna 3 that lies in the proximity of the two helix antennas 1, 2 in the retracted condition of the rod antenna 3, i.e. the upper region 5 of the rod antenna 3 extends essentially from the upper end 12 of the rod antenna 3 to the transition 13 of the rod antenna 3 that lies opposite or, respectively, under the matching network 8 in the retracted condition of the rod antenna 3 (FIG. 2). The upper region 5 of the rod antenna 3 is preferably formed of an electrically non-conductive material. This assures that the fields of the first helix antenna 1 and of the second helix antenna 2 are only slightly influenced by the rod antenna 3 in the retracted condition of the rod antenna 3, i.e. that the fields of the helix antennas 1, 2 are not passively deformed by the rod antenna 3. In this case, the electrical length of the rod antenna 3 is the length from the lower end 14 of the rod antenna 3 up to the transition 13. In particular, the upper region 5 of the rod antenna 3 has the function of enabling the retraction of the rod antenna 3 such that no conductive region of the rod antenna 3 lies in the proximity of the helix antennas 1,2 in the retracted condition of the rod antenna 3 (FIG. 2). The upper region 5 thus represents an insert extension.

As can be seen from FIG. 1, it is especially beneficial in view of the compact nature of the antenna device when the second helix antenna 2 is accommodated in a stub-shaped projection 11 of the housing 9 of the mobile radio telephone device 6. The rod antenna 3 can then be displaceably accommodated coaxially within the second helix antenna 2. The first helix antenna 1 built into the housing 9 preferably lies parallel to and slightly offset from the axis of the second helix antenna 2, as shown.

Even though the effect of electrical length of the first helix antenna 1, the second helix antenna 2 and the rod antenna 3, respectively, amount to ¼ of the wavelength λ of the frequency range to be received in the illustrated exemplary embodiment, it should nonetheless be noted that the division of the electrical lengths of the antennas is arbitrary as long as the sum of the electrical lengths of the antennas amounts to the desired overall length, preferably to half the wavelength λ of the frequency range to be received.

In this case, of course, care must be exercised to see that the electrical length of the second helix antenna 2 is equal to the electrical length of the rod antenna 3. Only in this way is it assured that a tuned antenna device is formed in any case, i.e. independently of the condition of the rod antenna 3.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An antenna device for mobile radio telephone devices, the device comprising:

an extensible rod antenna having an extensible free end and an opposite end opposite said free end;

first helix antenna disposed, when said rod antenna is extended, at said opposite end of said rod antenna;

a second helix antenna connectible to the first helix antenna and disposed beneath said first antenna at said opposite end of said rod antenna when said rod antenna is extended; and a connector element that connects only the rod antenna to the first helix antenna when the rod antenna is extended and connects only the second helix antenna to the first helix antenna when the rod antenna is retracted.

2. The antenna device according to claim 1 wherein the first helix antenna, the second helix antenna as well as the extensible rod antenna are each respectively tuned to a quarter of the wavelength of the frequency range to be transmitted/received.

3. The antenna device according to claim 1 wherein the rod antenna is composed of a non-conductive material in a region in proximity to the helix antennas when the rod antenna is retracted.

4. The antenna device according to claim 1 wherein the first helix antenna is a coil on a printed circuit board.

5. The antenna device according to one claim 1 wherein the rod antenna is coaxially arranged in the second helix antenna.

6. The antenna device according to claim 1 wherein the first helix antenna is arranged parallel to and slightly offset from the second helix antenna.

7. A mobile radio telephone device comprising:

a housing;

an extensible rod antenna having a free end which is extendable from and retractable to said housing, and having an opposite end opposite said free end;

a first helix antenna disposed, when said rod antenna is extended, at said opposite end of said rod antenna;

a second helix antenna connectible to the first helix antenna and disposed beneath said first antenna at said opposite end of said rod antenna when said rod antenna is extended; and a connector element that connects only the rod antenna to the first helix antenna when the rod antenna is extended and connects only the second helix antenna to the first helix antenna when the rod antenna is retracted.

8. The mobile radio telephone device according to claim 7 wherein said housing has a stub-shaped projection and wherein the second helix antenna is accommodated in said stub-shaped projection of the housing.

* * * * *